US005957117A

United States Patent [19]

Everingham

[11] Patent Number: 5,957,117
[45] Date of Patent: Sep. 28, 1999

[54] AUTOMOTIVE EMISSION CONTROL VALVE ASSEMBLY

[75] Inventor: Gary Everingham, Chatham, Canada

[73] Assignee: Siemens Canada Limited, Ontario, Canada

[21] Appl. No.: 08/908,396

[22] Filed: Aug. 7, 1997

[51] Int. Cl.[6] ............................ F02M 25/07; F16K 31/08

[52] U.S. Cl. ................................ 123/568.26; 251/129.15; 335/278

[58] Field of Search ......................... 251/129.15, 129.16; 335/278, 220, 225, 255–258

[56] References Cited

U.S. PATENT DOCUMENTS

| | | | |
|---|---|---|---|
| 4,944,276 | 7/1990 | House et al. | 123/520 |
| 4,961,413 | 10/1990 | Grey et al. | 123/568.26 |
| 5,094,218 | 3/1992 | Everingham et al. | 123/562.26 |
| 5,435,519 | 7/1995 | Everingham | 251/129.15 |
| 5,460,146 | 10/1995 | Frankenberg | 123/568.21 |
| 5,467,962 | 11/1995 | Bircann et al. | 251/129.15 |
| 5,494,255 | 2/1996 | Pearson et al. | 251/129.15 |
| 5,588,414 | 12/1996 | Hrytzak et al. | 123/568.26 |
| 5,593,132 | 1/1997 | Hrytzak | 123/129.15 |

*Primary Examiner*—Tony M. Argenbright
*Assistant Examiner*—Arnold Castro

[57] ABSTRACT

A valve assembly, preferably an electric exhaust gas recirculation valve, including a housing with an open end and a base end. The base end having a passage that allows exhaust gas flow therethrough by a salve member operated by an electric actuator. A cap is secured to the open end of the housing with a retainer. The retainer having a renovable snapfit engagement with the housing.

41 Claims, 4 Drawing Sheets

AUTOMOTIVE EMISSION CONTROL VALVE ASSEMBLY

FIELD OF INVENTION

The present invention relates to automotive emission control valves, for example, an exhaust gas recirculation (EGR) valve for an internal combustion engine. More particularly, the present invention relates to a packaging assembly for an electric EGR valve.

BACKGROUND OF THE INVENTION

Electric exhaust gas recirculation (EEGR) valves may include a housing with an electrical actuator in the housing that operates a valve member to allow exhaust gas to flow through a passage provided in a portion of the housing. The housing includes an open end that allows for installment of the electrical actuator and the valve member. A cap is placed on the open end of the housing to close the housing and to secure the electrical actuator in a fixed position within the housing. The cap is provided with an electrical connection therethrough to operate the electrical actuator. In order to secure the cap and housing together, different fastening techniques have been employed.

One method of attaching the cap to the housing is to employ a clinch ring. The clinch ring is deformed to a fixedly secured position around an outwardly extending flange portion provided on each of the cap and the housing. In order to install a clinch ring and secure the cap onto the housing, the flange of the housing and the cap must be suitably sized for engagement by the clinch ring. Because of the flange provided on each of the cap and the housing, the overall packaging size of the EEGR valve is increased. Furthermore, because the clinch ring is deformed and secured in place around the flanges of the cap and the housing, installation of the clinch ring may require many steps, and once the clinch ring is secured in place it is difficult to remove.

An alternative method of securing the cap to the open end of the housing provided in an EEGR valve is to deform a portion of the housing itself around the cap. For example, a portion of the housing is sized so that it can be deformed towards a central axis of the valve assembly, and, thus, surround a portion of the cap to hold the cap on the open end of the housing. Although the deformed housing securely holds the cap on the housing, if, during assembly, the housing deforming process is not carried out in the appropriate manner, the housing can be destroyed. In addition, deforming the housing around the cap is labor intensive and requires accurate manufacturing steps that may increase the overall cost of producing the EEGR valve. Furthermore, once the housing is deformed around the cap, removal of the cap becomes very difficult without damaging the housing.

SUMMARY OF THE INVENTION

Accordingly, it would be desirable to provide an EEGR valve that alleviates the problems of EEGR valves in the past that employ a clinch ring or a deformed housing in order to secure the cap to the housing.

It would also be desirable to provide an EEGR valve with a packaging assembly that allows for securing the cap to the housing with a single assembly step.

It would also be desirable to provide an EEGR valve with a reduced size and efficient packaging assembly, yet still provide for assembly in a single step.

It would also be further desirable to provide an EEGR assembly that allows for a removable connection between the cap and the housing. The removable connection would preferably allow for assembly without specific alignment of the removable connection, and further allow for reduced manufacturing tolerances of the valve packaging assembly.

The present invention provides a valve assembly, preferably an EEGR valve assembly, including a housing with an open end and a base end having a passage. A valve member is disposed within the housing that opens and closes the passage. An electric actuator is provided within housing to operate the valve member. A cap is provided proximate the open end to close the housing.

In order to secure the cap to the housing, a retainer that surrounds a portion of the cap is provided. The retainer includes at least one locking tab that engages at least one locking tab receiver provided on the housing. In a preferred embodiment, the at least one locking tab and the at least one locking tab receiver engage to provide a snap-fit connection. The snap fit connection being removable, that is, readily disengaged.

In a preferred embodiment of the invention, the retainer comprises a snap ring having a cylindrical wall with a lip at the first end of the cylindrical wall. The lip extends toward a central axis of the cylindrical wall. The cylindrical wall is provided with at least one projection between the first end and a second end of the cylindrical wall. The at least one projection serves as the at least one locking tab that engages the at least one locking tab receiver provided on the housing.

Also, in a further preferred embodiment of the invention, the housing comprises a shell attached to a base. The shell comprises an end wall that is substantially perpendicular to a longitudinal axis of the shell. The longitudinal axis being substantially parallel with a cylindrical wall that is connected to the end wall. The cylindrical wall has an open end that serves as the open end of the housing.

Proximate the open end of the cylindrical wall, a flange is provided that extends away from the longitudinal axis of the shell. Between the open end and the end wall, the cylindrical wall is provided with at least one cut-out member extending toward the longitudinal axis. The flange or the cut-out member serve as the at least one locking tab receiver that removeably engages the at least one locking tab of the retainer.

By providing the present invention described above, a cap of an EEGR valve can be removeably secured to the housing in a manner that requires limited manufacturing assembly steps and provides a simple valve packaging structure. That is, by providing a packaging component of the EEGR valve (i.e. the retainer) that allows for a readily removable snapfit engagement connection, the cap of the valve assembly can be secured to the housing in a single step assembly process and without regard to precise alignment of the valve packaging components during assembly.

BRIEF DESCRIPTION OF THE DRAWINGS

The accompanying drawings, which are incorporated herein and constitute part of this specification, illustrate presently preferred embodiments of the invention, and, together with a general description given above and a detailed description of the preferred embodiments given below, serve to explain the principles of the invention.

DETAILED DESCRIPTION OF THE PREFERRED EMBODIMENTS

Figure 1:
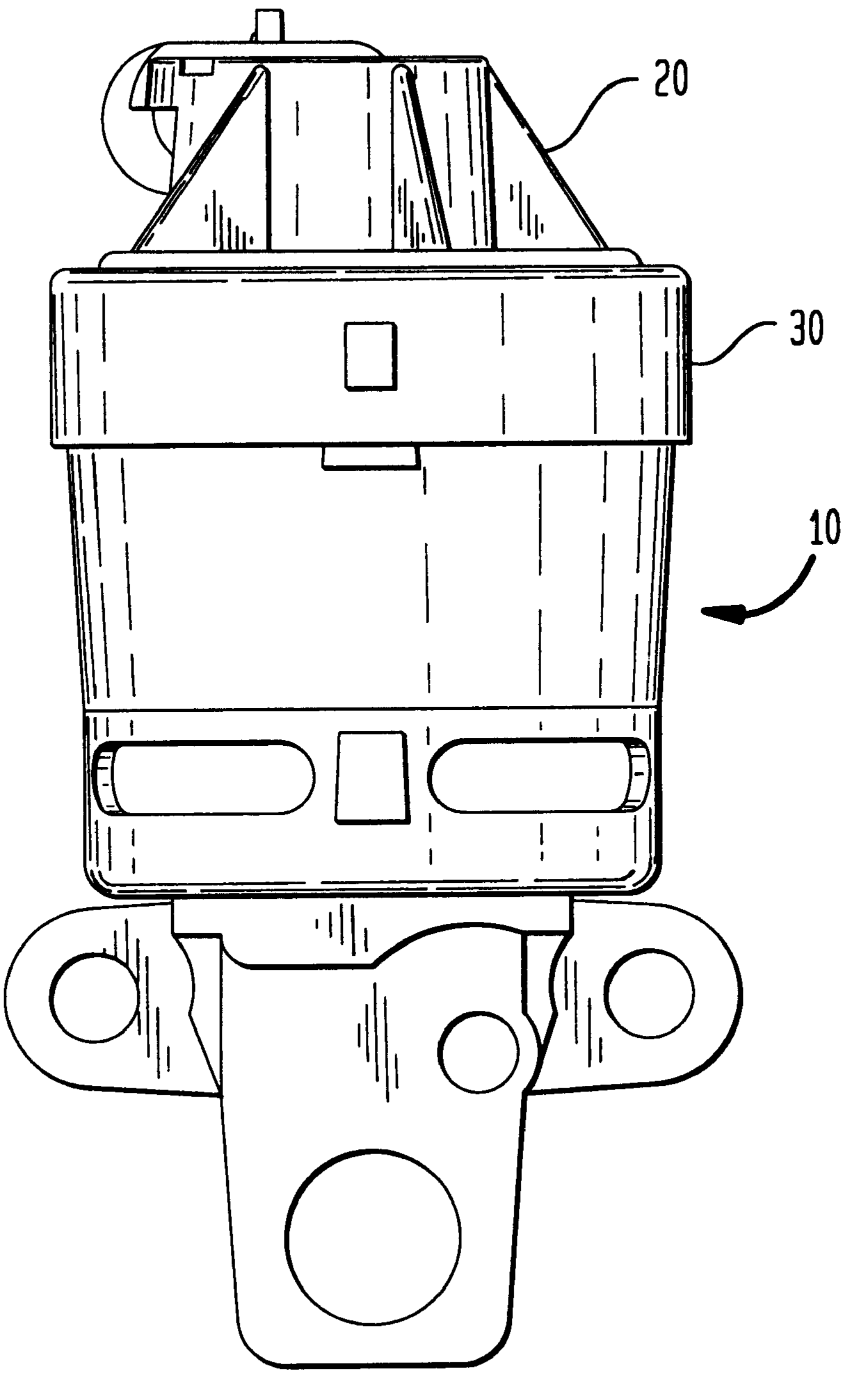
FIG. 1. is a front elevation view of an EEGR valve, embodying the principles of the present invention.

FIG. 1. illustrates a side elevation of the electric exhaust gas recirculation (EEGR) valve of the present invention. The EEGR valve includes a housing 10, a cap 20, and a retainer 30. The retainer 30 removeably secures the cap to the housing 10. The retainer 30 provides a removable snap engagement with the housing 10. The retainer 30 allows for the cap 20 to be securely held on the housing 10 without an extended flange on each of the housing 10 and the cap 20, or without deforming a portion of the housing 10 around the cap 20.

Figure 2:
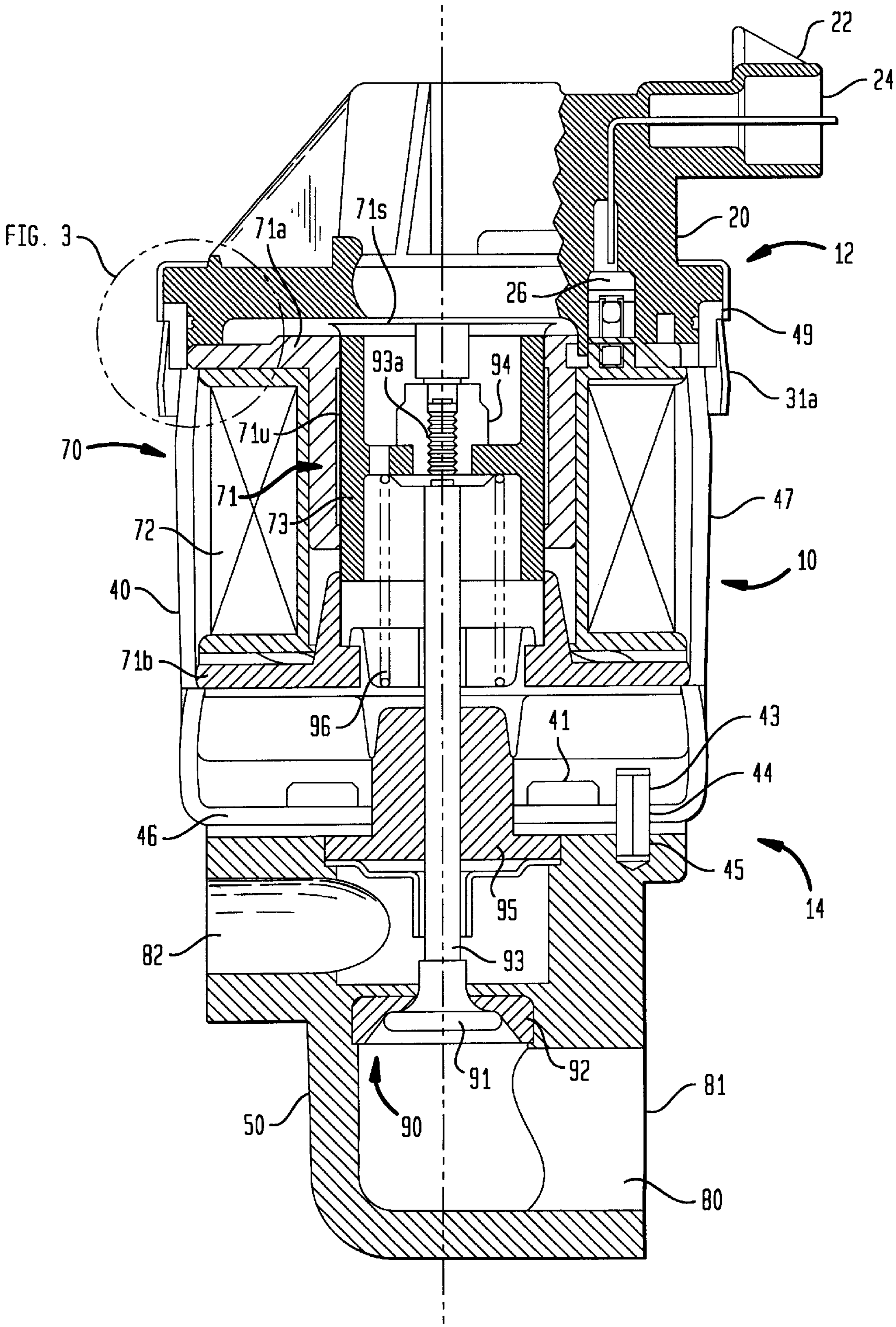
FIG. 2. is an enlarged view, partially cross section, of the EEGR valve of FIG. 1.

Referring to FIG. 2, the housing 10 of the present invention preferably includes an open end 12 and a base end 14. The open end 12 is closed by cap 20. In a preferred embodiment of the invention, the housing 10 comprises a shell 40 attached to a base 50 by a plurality of fastening devices.

The fastening devices may include, for example, a plurality of screws 41 as illustrated by the screw heads in FIG. 2, however, the shell 40 could be secured to base 50 by bolts, rivets, etc., or other suitable fastening arrangements such as gluing or welding the shell 40 to base 50. The base 50 is provided with a plurality of screw receiving holes (not illustrated) that align with screw holes 42 in the shell 40. The plurality of screws are placed through the screw holes 42 to secure the shell 40 to the base 50. In order to align the screw holes 42 of the shell 40 and the screw receiving holes of the base 50 an alignment pin 43 is employed. An alignment pin hole 44 is provided in the shell 40 and an alignment pin receiving hole 45 is provided in the base 50. When the shell 40 is placed on the base 50, the shell 40 is orientated to align the alignment pin hole 44 and the alignment pin receiving hole 45 so that the alignment pin 46 can be placed through the alignment pin hole 44 of shell 40 and engage the alignment pin receiving hole 45 in the base 50.

Figure 5:
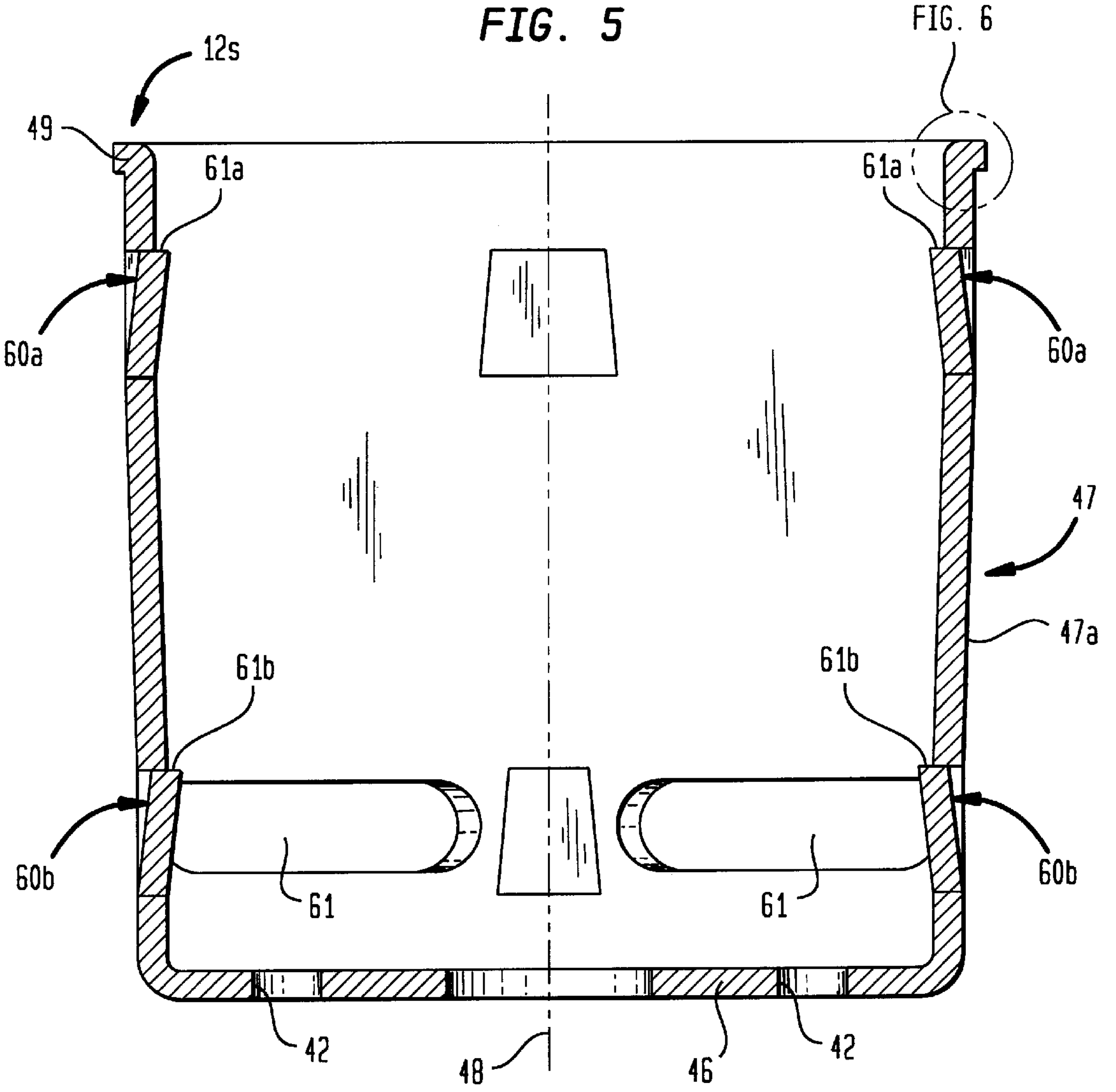
FIG. 5. is an enlarged cross sectional view of the shell of the present invention illustrated in FIGS. 1 and 2.
Figure 6:
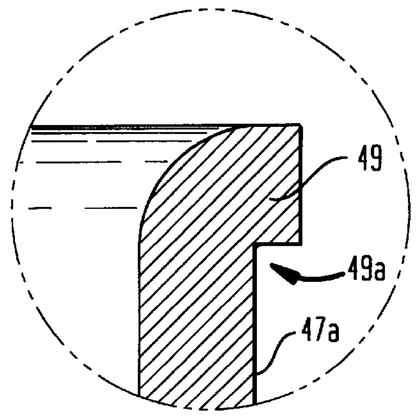
FIG. 6. is an enlarged view of the encircled portion 6 in FIG. 5.

Shell 40 preferably includes an end wall 46 that is secured to the base 50 by the plurality of screws 44, and at least one side wall 47 connected to end wall 46. In a preferred embodiment, the at least one side wall 47 comprises a generally cylindrical wall 47*a* extending upward from the end wall 46. As shown in FIG. 5, a longitudinal axis 48 of the shell 40 extends perpendicular to the end wall 46 and substantially parallel to the cylindrical wall 47*a* that forms the side wall 47. The cylindrical wall 47*a* terminates at an open end 12*s* of the shell 40. The open end 12*s* serves as the open end 12 of the housing 10. At the open end 12*s* of the shell 40 and at the top of the cylindrical wall 47*a*, a flange 49, as shown in FIGS. 2, 5, and 6, extends around the perimeter of the cylindrical wall 47*a*. The flange 49 extends away from the longitudinal axis 48.

The shell 40 is also provided with a plurality of cut-out members 60*a* and 60*b* that extend toward the longitudinal axis 48. In addition to the cut-out members 60*a* and 60*b*, the cylindrical wall 47*a* of the shell 40 is provided with a plurality of openings 61 that, in the preferred embodiment, are provided approximate the end wall 46. The plurality of openings 61, which are approximate the end wall 46, serve as openings that allow for cooling of the EEGR valve.

Figure 3A:
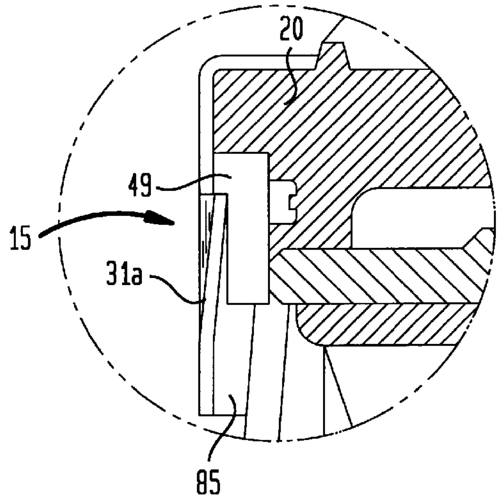
FIG. 3A. is an enlarged view of the encircled portion 3 illustrated in FIG. 2.
Figure 3B:
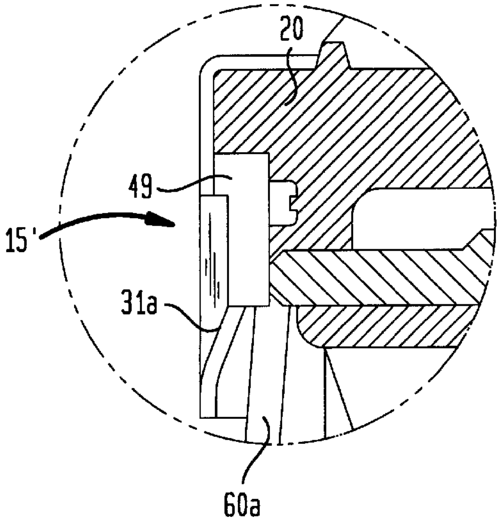
FIG. 3B is an enlarged view of an alternative embodiment of the encircled portion 3 illustrated in FIG. 2.

Either flange 49 or the cut-out member 60*a* serves as a locking tab receiver on the housing 10. More specifically, as shown in FIG. 3A, flange 49 serves as locking tab receiver 15, while in FIG. 3B, cut-out member 60 serves as locking tab receiver 15'. That is, the flange 49 or the cut-out member 49*a* form an engagement member that mates with a locking tab 31 that is provided on the retainer 30. As shown in FIG. 3A, the first preferred embodiment of the invention, locking tab 31 engages flange 49 to secure cap 20 to the shell 40 of housing 10. In second preferred-embodiment of the invention, as shown in FIG. 3*b*, locking tab 31 engages cut-out member 60*a* to secure the retainer 30 to the shell 40 of housing 10.

Figure 4:
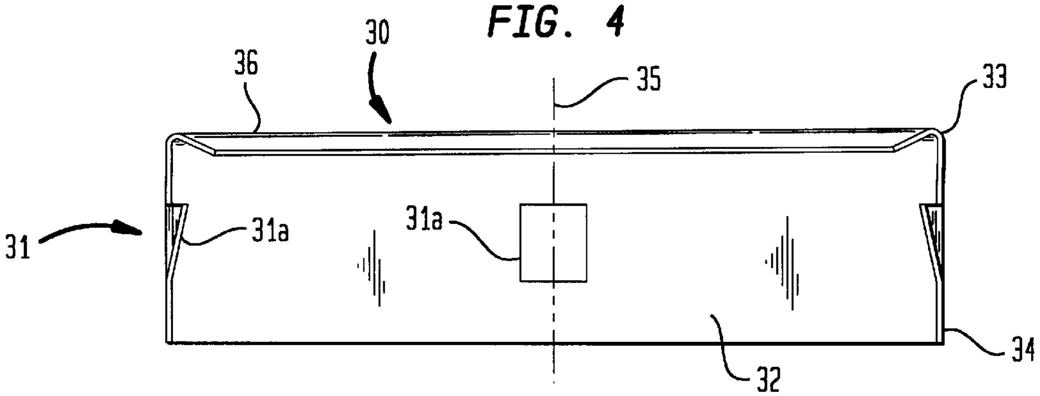
FIG. 4. is an enlarged cross sectional view of the retainer of the present invention illustrated in FIGS. 1 and 2.

As shown in FIG. 4, the retainer 30 preferably comprises a plurality of locking tabs 31 that engage a locking tab receiver 15 or 15' provided on housing 10. As discussed above, in the preferred embodiments of the invention, the locking tab receiver 15 or 15' comprises either the flange 49 or the plurality of cut-out members 60*a*. By engaging either of the respective locking tab receivers 15 or 15' the retainer 30 is secured to the shell 40.

The retainer 30 comprises a snap ring having a cylindrical wall 32. The cylindrical wall 32 has a first end 33 and second end 34. Between the first end 32 and the second end 24, a plurality of projections 31*a*, preferably four but at least two, are provided that serve as locking tabs 31.

It should be noted that the quantity of cut-out members 60*a* may be greater than the quantity projections 31*a*, however, at a minimum the quantity of cut-out-members 60*a* should be equal to the quantity of projections 31*a*. By providing additional cut-out members 60*a* than projections 31*a*, engagement of the retainer 30 and shell 40 can be even further simplified. That is, to secure the cap 20 to the open end 12 of the housing 10, the retainer 30 can engage the housing 10 at any of the cut-out members 60*a*, and, thus, effectively eliminate the need for precise alignment of the projections 31*a* with respective cut-out members 60*a*. Preferably, there are two cut-out members 60*a* on opposite sides of the housing 10 so that the retainer 30 can be secured to the housing 10.

The projections 31*a* extends towards a central axis 34 of the cylindrical wall 32. The projections 31*a* preferably comprise cut-out members of a rectangular shape with one end secured to the cylindrical wall 32. Each projection cut-out member is preferably formed by lancing a portion of the cylindrical wall 32.

The snap ring of retainer 30 is also provided with a lip 36 that projects toward a longitudinal central axis 35 of the cylindrical wall 32. In the preferred embodiment of the invention, the ring comprises a monolithic member formed from a sheet of metallic material. That is, the cylindrical wall 32 and lip 36 are a continuous structural member.

The lip 36*a* engages cap 20 and biases the cap 20 toward the open end 12*s* of the shell 40. Accordingly, the lip 36 serves as a spring member that, in addition to the snapfit locking engagement between the locking tab 31 of the retainer 30 and locking tab receiver 15 or 15' of the shell 40, serves as an additional member that secures the cap 20 to the shell 40 of the housing 10.

The lip 36 serves as a spring member that biases the cap 20 toward the open end 12*s* of the shell 40 because the lip 36 is oblique to the central axis 35 of the retainer 30, while the cylindrical wall 32 of the retainer 30 is substantially parallel with the central axis 35. Because the lip 36 extends from the first end 33 of the cylindrical wall 32 toward the central axis 35 at a non-perpendicular angle (i.e. an oblique angle), when the retainer 30 is fit over the cap 20 and the locking tab 31 engages the locking tab receiver 15 or 15' of the shell 40, the lip 36 forces the cap 20 toward the shell 40.

As discussed above and shown in FIGS. 3A and 3B, the retainer 30 can be dimensioned such that the locking tab 31 engages different locking tab receivers 15, 15' on the shell 40, for example, either the flange 49 or the cutout member 60*a* of the shell 40. As discussed above, in the first preferred embodiment of the invention illustrated in FIGS. 2 and 3*a*, the locking tab 31 of the retainer 30 engages the flange 49. In order to insure that the projection 31*a* of the retainer 30, which serves as the locking tab 31, engages the flange 49 in a secure manner and without removal from frictional forces that the projection 31*a* places on flange 49, the flange 49 is provided with a sharp radius with respect to the cylindrical wall 47*a*. The radius between the cylindrical wall 37*a* and the portion of the flange 49, which extending away from the cylindrical wall 47*a*, is configured such that the projection 31*a* will remain secure to the flange 49. That is, the projection 31*a* will remain substantially in the corner 49*a* of the flange 49 without slipping along the flange 49. For example, in a preferred embodiment of the invention, the radius between the extending portion of flange 49 and the cylindrical wall 47*a* is a maximum of 0.2 millimeters.

In addition to serving as the alternative locking tab receiver 15', cut-out members 60*a* provide an additional function for the EEGR valve assembly. That is, the cut-out members 60*a* provide support for the electric actuator 70. In the preferred embodiment of the invention, the shell 40 is provided with a plurality of cut-out members 60*b* in addition to the plurality of cutout members 60*b*. The cut-out members 60*a* and 60*b*, respectively, provide a plurality of upper and lower sets of landing pads 61*a* and 61*b* that secure the electrical actuator 70 within the shell 40.

The electric actuator 70 includes a stator structure 71 that provides a magnetic circuit path, a coil 72 adjacent the stator structure 71, and an armature 73 proximate the stator structure 71 that is acted upon by the magnetic flux in the magnetic circuit path. The stator structure 71 includes an upper stator member 71*a* that is held in place by an upper group of Landing pads 61*a* provided by the upper set of cut-out members 60*a*. The stator structure further comprises a lower stator member 71*b* that is held in place by a lower group of landing pads 61*b* provided by the lower set of cut-out members 60*b*.

The base 50 of the housing 10 includes a passage 80 that is opened and closed by a valve member 90. The valve member 90 includes a valve head 91 that operates in conjunction with a valve seat 92. The valve head 91 is displaced from the valve seat 92 by corresponding movement of the armature 72 relative to the stator structure 71 of the electric actuator. The armature 72 is moved within the upper stator member 71*a* and the lower stator member 71*b* when a coil 72 is provided with a pulse width modulated signal. The upper stator member 71*a* and the lower stator member 71*b* are axially separated to form an air gap. Preferably a sleeve 71*s* is provided between the stator structure 71 and the armature 72. In order to reduce radial forces acting on the armature 72, the inner surface of the upper stator member 71*a* is provided with an undercut 71*u* that defines a minimum air gap between the armature 72 and the upper stator member 71*a*.

The cap 20 includes a portion 22 that extends outward to provide an area for an electrical connector shell 24. The electrical connector shell 24 has an electrical connector 26 that extends through the cap 20 to the coil 72 of the electric actuator 70.

A shaft 93 extends from the armature 73 to the valve head 91. The shaft 93 is fixedly secured to the armature 73 by a threaded portion 93*a* of the shaft 93 and a nut 94 that engages the threaded portion 93*a* of the shaft 93. The shaft 93 is guided in a central through hole of a bearing 95 provided between the lower stator member 71*b* and the valve seat 92. The valve seat 92 is disposed within the base 50 of the housing 10. The valve head 91 of the valve member 90 is biased toward the valve seat 92 by a spring 96 that engages the armature 72 of the electric actuator 70.

The base end 50 of the housing 10 comprises the passage 80. The passage 80 includes an entrance 81 that allows engine exhaust gas, from an internal combustion engine, to enter the base end 50 for recirculation. The passage extends through the base end 50 for conveying engine exhaust gas that has entered the passage 80, and an exit 82 at which engine exhaust gas that has passed through the passage 80 exits. The valve member 90 is controlled by the electric actuator 70 to control the flow of gas through the passage.

In order to assemble the EEGR valve of the present invention, the base end 50 and the shell 40 are secured together, preferably, as discussed above by a plurality of screws 41 with the aid of the alignment pin 44. Then, the electric actuator 70 is installed within the shell 40. Once electric actuator 70 is installed within the shell 40, the cap 20 is placed approximate the open end 12*s* of the shell 40. In order to secure the cap 20 to the shell 40, the retainer 30 is placed over the cap 20 and forced down such that the retainer 30 surrounds at least a portion of the cap 20, and locking tabs 31 of the retainer 30 snap engage the locking tab receiver 15 of the housing 10.

Although the cap 20 is securely held onto the shell 40 by retainer 30, the arrangement of the locking tabs 31 in the form of the projections 31*a* extending toward the central axis 35 of the retainer 30 allows for a gap 85 in the area between cylindrical wall 47*a* of the shell 40 and the cylindrical wall 32 of the retainer 30. This gap 85 allows for installation of a tool that can bias the projections 31*a* away from the central axis 35 of the retainer 30. When the projections 31*a* are biased away from the central axis 35, the retainer 30 can be readily removed from the shell 40.

When the EEGR valve of the present invention is completely assembled, the longitudinal axis 48 of the shell 40 and the central axis 35 of the retainer 30 are coaxial. When the retainer 30 surrounds the shell 40, the diameter of cylindrical wall 32 of the retainer 30 and the diameter of the cylindrical wall 47*a*. of the shell 40 have a maximum value of 65 millimeters. More particularly, the retainer's cylindrical wall 32 has a larger diameter than the shell's cylindrical wall 47*a*, and the retainer's cylindrical wall 32 is no greater than 65 millimeters, preferably, 63 millimeters. Furthermore, the overall length of the assembled EEGR is less than 135 millimeters, particularly 132 millimeters.

Accordingly, the snap engaging retainer 30 of the present invention removeably secures the cap 20 to the housing 10. Although, the claimed invention has been described with the locking tab being provided on the retainer 30 and the locking tab receiver being provided on the shell 40, it should be readily understood that the locations of the locking tab and the locking tab receiver could be reversed.

Other embodiments of the present invention will be apparent to those skilled in the art upon consideration of the specification disclosed herein. It is intended that specification be considered as exemplary only, with the true scope and spirit of the invention being indicated by the appended claims.

I claim:

1. A valve assembly comprising:

a housing having an open end and a base end with a passage;

a valve member disposed within the housing that opens and closes the passage;

an electric actuator within the housing that operates the valve member;

a cap proximate the open end; and a retainer that surrounds and mates with a portion of the cap;

wherein one of the retainer and the housing comprises at least one locking tab and the other of the retainer and the housing comprise at least one locking tab receiver;

wherein the at least one locking tab engages the at least one locking lab receiver.

2. The valve assembly of claim 1, wherein the retainer includes the at least one locking tab that engages the at least one locking tab receiver of the housing.

3. The valve assembly of claim 2, wherein the retainer comprises a snap ring having cylindrical wall with a central axis, a first end, and a second end.

4. The valve assembly of claim 3, wherein the at least one locking tab comprises a projection between the first end and the second end of the cylindrical wall.

5. The valve assembly of claim 4, wherein the projection comprises a cut-out portion of the cylindrical wall that is between the first end and the second end, the projection being oblique to the central axis.

6. The valve assembly of claim 5, wherein the cut-out portion comprises a rectangle with at least one side attached to the cylindrical wall.

7. The valve assembly of claim 3, wherein the retainer further comprises a lip extending from the first end of the cylindrical wall toward the central axis.

8. The valve assembly of claim 7, wherein the cylindrical wall and the central axis are substantially parallel and the lip and the central axis are oblique.

9. The valve assembly of claim 8, wherein the cylindrical wall and the lip comprise a monolithic member.

10. The valve assembly of claim 9, wherein the monolithic member comprises a sheet of metallic material.

11. The valve assembly of claim 1, wherein the valve assembly comprises an electric exhaust gas recirculation valve for an internal combustion engine;

wherein the passage of the base end comprises an entrance at which engine exhaust gas to be recirculated enters the base end, the passage extends through the base end for conveying engine exhaust gas that has entered the entrance, an exit at which engine exhaust gas that has passed through the passage exits the base end; and wherein the valve member controls engine exhaust gas flow through the passage.

12. A valve assembly comprising:

a housing having an open end and a base end with a passage;

a valve member disposed within the housing that opens and closes the passage;

an electric actuator within the housing that operates the valve member;

a cap proximate the open end; and a retainer that surrounds a portion of the cap;

wherein one of the retainer and the housing comprises at least one locking tab and the other of the retainer and the housing comprise at least one locking tab receiver;

wherein the at least one locking tab engages the at least one locking tab receiver;

wherein the housing includes a shell attached to a base, the base comprising the basic end with the passage;

wherein the shell comprises a longitudinal axis, an end wall substantially perpendicular to the longitudinal axis, at least one side wall connected to the end wall, the at least one side wall being substantially parallel with the longitudinal axis, and an open end proximate the at least one side wall comprising the open end of the housing; and wherein the at least one wall comprises a cylindrical wall with a flange at the open end, the flange extending away from the longitudinal axis, the flange serving as the at least one locking tab receiver.

13. The valve assembly of claim 12 wherein the retainer comprises a snap ring:

a cylindrical wall having a central axis, a first end, and a second end;

a lip extending from the first end of the cylindrical wall toward the central axis;

at least one projection between the first end and the second end of the cylindrical wall that serves as the at least one locking tab;

wherein the at least one projection engages the flange.

14. The valve assembly of claim 13 wherein the at least one projection comprises a plurality of projections.

15. The valve assembly of claim 14 wherein the quantity of the plurality of projections comprises at least four.

16. The valve assembly of claim 18 wherein the cylindrical wall further comprises at least one cut-out member extending toward the longitudinal axis.

17. A valve assembly comprising:

a housing having an open end and a base end with a passage;

a valve member disposed within the housing that opens and closes the passage;

an electric actuator within the housing that operates the valve member;

a cap proximate the open end; and a retainer that surrounds a portion of the cap;

wherein one of the retainer and the housing comprises at least one locking tab and the other of the retainer and the housing comprise at least one locking tab receiver;

wherein the at least one locking tab engages the at least one locking tab receiver;

wherein the housing includes a shell attached to a base, the base comprising the base end with the passage;

wherein the shell comprises a longitudinal axis, an end wall substantially perpendicular to the longitudinal axis, at least one side wall connected to the end wall, the at least one side wall being substantially parallel with the longitudinal axis, and an open end proximate the at least one side wall comprising the open end of the housing; and wherein the at least one sidewall comprises a cylindrical wall with at least one cutout member extending toward the longitudinal axis, the at least one cutout serving as the at least one locking tab receiver.

18. The valve assembly of claim 17, wherein the retainer comprises:

a cylindrical wall having a central axis, a first end, and a second end;

a lip extending from the first end of the cylindrical wall toward the central axis;

at least one projection between the first end and the second end of the cylindrical wall that serves as the at least one locking tab;

wherein the at least one projection engages the at least one cut-out member of the cylindrical wall.

19. The valve assembly of claim 18, wherein the cylindrical wall further comprises a flange at the open end, the flange extending away from the longitudinal axis.

20. The valve assembly of claim 18, wherein the at least one projection comprises a plurality of projections;

wherein the at least one cut-out member comprises a plurality of cut-out members; and wherein a quantity of the plurality of cut-out members is at least equal to a quantity of the plurality of projections.

21. The valve assembly of claim 20, wherein the quantity of the plurality of cut-out members comprises at least two.

22. The valve assembly of claim 21, wherein the quantity of plurality of cut-out members is greater than the quantity of plurality of projections.

23. A valve assembly comprising:

a housing having an open end and a base end with a passage;

a valve member disposed within the housing that opens and closes the passage;

an electric actuator within the housing that operates the valve member;

a cap proximate the open end; and a retainer that surrounds a portion of the cap;

wherein one of the retainer and the housing comprises at least one locking tab and the other of the retainer and the housing comprise at least one locking tab receiver;

wherein the at least one locking tab engages the at least one locking tab receiver;

wherein the electric actuator includes:

a stator structure that provides a magnetic circuit path;

a coil proximate the stator structure; and an armature proximate the stator structure to be acted upon by magnetic flux in the magnetic circuit path and correspondingly operate the valve member;

wherein the housing includes a shell attached to a base;

wherein the base serves as the base end; and wherein the shell comprises a longitudinal axis, an end wall substantially perpendicular to the longitudinal axis, a cylindrical wall connected to the end wall, the cylindrical wall being substantially parallel with the longitudinal axis, and an open end proximate the cylindrical wall comprising the open end of the housing, the cylindrical wall including a flange at the open end, the flange extending away from the longitudinal axis, the cylindrical wall including a plurality of cut-out members extending toward the longitudinal axis, each of the plurality of cut-out members comprising a landing pad substantially perpendicular to the longitudinal axis.

24. The valve assembly of claim 23, wherein the stator structure comprises an upper stator member and a lower stator member cooperatively defining an air gap in the magnetic circuit path; and wherein the plurality of cut-out members comprise an upper and a lower set of cut-out members, the upper set of cut-out members providing an upper group of landing pads that supports the upper stator member within the shell, and the lower set of cut-out members providing a lower group of landing pads that supports the lower stator member within the shell.

25. The valve mechanism of claim 23, further comprising a shaft extending from the armature of the electric actuator to the valve member.

26. The valve assembly of claim 23, wherein the valve member comprises a valve head attached to the shaft and a valve seat disposed in the passage.

27. The valve assembly of claim 23, farther comprising a bearing member including a central through-hole for guidance of the shaft extending from the armature of the electric actuator to the valve member.

28. The valve assembly of claim 23, wherein each of the upper stator member and the lower stator member include an opening in which the armature is disposed.

29. The valve assembly of claim 24, wherein the coil is disposed between the upper stator member and the lower stator member.

30. The valve assembly of claim 29, wherein the cap includes an electrical connector shell.

31. The valve assembly of claim 30, wherein the retainer comprises:

a cylindrical wall having a central axis, a first end, and a second end;

at least one projection between the first end and the second end of the cylindrical wall that serves as the at least one locking tab;

wherein the at least one projection engages at least one of the flange and the at least one cut-out member;

wherein the at least one of the flange and the at least one cut-out member serves as the at least one locking tab receiver.

32. The valve assembly of claim 31, wherein the lip is oblique to the central axis so that the lip biases the cap toward the shell.

33. An electric exhaust gas recirculator (EEGR) valve packaging assembly, the EEGR valve including an electric actuator that operates a valve member, the packaging assembly comprising;

a base;

a shell having an end wall, at least one side wall, and an open end, the end wall being connected to the base;

a cap that closes the open end of the shell; and a retainer that surrounds and mates with a portion of the cap, the retainer including a locking tab that snap engages the at least one sidewall.

34. The EEGR valve packaging assembly of claim 33, wherein the retainer comprises a snap ring having:

a cylindrical wall having a central axis, a first end, and a second end;

a lip extending from the first end of the cylindrical wall toward the central axis; and a projection between the first end and the second end of the cylindrical wall that snap engages a portion of the at least one side wall.

35. The EEGR valve packaging assembly of claim 34, wherein the shell comprises a longitudinal axis substantially perpendicular to the end wall, the at least one side wall being connected to the end wall, the at least one side wall comprising a cylindrical wall that is substantially parallel with the longitudinal axis, and the open end being proximate the cylindrical wall.

36. The valve assembly of claim 35, wherein the cylindrical wall of the shell comprises at least one of a flange and a cut-out member, wherein the at least one of the flange and the cut-out member serves as the portion of the at least one side wall that the projection engages.

37. The valve assembly of claim 40, wherein the cylindrical wall of the retainer surrounds a portion of the cylindrical wall of the shell.

38. The valve assembly of claim 37, wherein a maximum diameter the cylindrical wall of the retainer and the cylindrical wall of the shell comprises a valve no greater than approximately 65 millimeters.

39. An electric exhaust gas recirculation EEGR valve packaging assembly, the EEGR including an electric actuator that operates a valve member, the packaging assembly comprising:

a base;

a shell having an end wall connected to the base, at least one sidewall, and an open end;

a cap that closes the open end of the shell; and a retainer that surrounds a portion of the cap and the at least one side wall, the retainer including a cylindrical wall having a central axis, a first end, a second end, and a lip extending from the first end of the cylindrical wall toward the central axis;

wherein the lip biases the cap toward the open end of the shell.

40. The EEGR valve packaging assembly of claim 39, wherein one of the retainer and the shell comprises at least one locking tab and the other of the retainer and the shell comprises at least one locking tab receiver; and wherein the at least one locking tab engages the at least one locking tab receiver to secure the cap to the shell.

41. The packaging assembly of claim 40, wherein the retainer comprises a projection between the first end and the second end of the cylindrical wall that serves as the at least one locking tab.

* * * * *